(12) United States Patent
Sun et al.

(10) Patent No.: US 12,124,129 B2
(45) Date of Patent: Oct. 22, 2024

(54) DISPLAY APPARATUS AND DISPLAY METHOD THEREOF

(71) Applicant: BOE Technology Group Co., Ltd., Beijing (CN)

(72) Inventors: Yanliu Sun, Beijing (CN); Pengxia Liang, Beijing (CN); Xue Dong, Beijing (CN); Hongpeng Li, Beijing (CN); Jiahui Han, Beijing (CN); Ge Shi, Beijing (CN); Zheng Fang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/754,524

(22) PCT Filed: Mar. 23, 2021

(86) PCT No.: PCT/CN2021/082454
§ 371 (c)(1),
(2) Date: Apr. 5, 2022

(87) PCT Pub. No.: WO2022/198455
PCT Pub. Date: Sep. 29, 2022

(65) Prior Publication Data
US 2024/0061290 A1    Feb. 22, 2024

(51) Int. Cl.
*G02F 1/1335*   (2006.01)
*G02B 30/29*    (2020.01)
*G02F 1/1343*   (2006.01)

(52) U.S. Cl.
CPC ....... *G02F 1/133607* (2021.01); *G02B 30/29* (2020.01); *G02F 1/134336* (2013.01)

(58) Field of Classification Search
CPC ......... G02F 1/133607; G02F 1/134336; G02B 30/29
See application file for complete search history.

(56) References Cited

U.S. PATENT DOCUMENTS

2016/0323566 A1   11/2016   Vdovin et al.
2019/0253697 A1   8/2019    Kim et al.
(Continued)

FOREIGN PATENT DOCUMENTS

CN   102169236 A   8/2011
CN   104345459 A   2/2015
(Continued)

OTHER PUBLICATIONS

English machine translation of CN 111766716A (Year: 2020).*
(Continued)

*Primary Examiner* — Anne M Hines
(74) *Attorney, Agent, or Firm* — Workman Nydegger (57) ABSTRACT

The disclosure provides a display apparatus and a display method thereof. The display apparatus includes: a display panel, including a plurality of pixel columns which extend in a first direction and are arranged in a second direction, wherein each of the pixel columns includes a plurality of pixel islands arranged in the first direction, each of the pixel islands includes at least four sub pixels which have the same color, and in the second direction, (odd number)$^{th}$ pixel columns are dislocated by a first preset distance relative to (even number)$^{th}$ pixel columns in the first direction; a light-transmitting pad layer, located on a light-emitting side of the display panel; and a cylindrical lens structure, located on one side of the light-transmitting pad layer face away from the display panel and including a plurality of cylindrical lenses.

20 Claims, 8 Drawing Sheets

(56) References Cited

U.S. PATENT DOCUMENTS

| | | |
|---|---|---|
| 2021/0158740 A1 | 5/2021 | Yang et al. |
| 2022/0311991 A1 | 9/2022 | Hong |
| 2022/0366819 A1 | 11/2022 | Gao et al. |
| 2022/0394236 A1 | 12/2022 | Gao |

FOREIGN PATENT DOCUMENTS

| | | |
|---|---|---|
| CN | 106067969 A | 11/2016 |
| CN | 110166762 A | 8/2019 |
| CN | 110632767 A | 12/2019 |
| CN | 110824725 A | 2/2020 |
| CN | 111552093 A | 8/2020 |
| CN | 111624784 A | 9/2020 |
| CN | 111766716 A | 10/2020 |
| CN | 113311594 A | 8/2021 |
| JP | 2005045323 A | 2/2005 |

OTHER PUBLICATIONS

English machine translation of CN102169236A (Year: 2011).*
Extended European Search Report, mailed Aug. 1, 2023, from EP App. No. 21932086.8, 9 pages.

* cited by examiner

DISPLAY APPARATUS AND DISPLAY METHOD THEREOF

FIELD

The disclosure relates to the technical field of display, in particular to a display apparatus and a display method thereof.

BACKGROUND

In a near-to-eye display technology, a 3D object is realized by displaying different images to left and right eyes of a user respectively and then forming a stereoscopic vision, 3D display formed based on human-eye stereoscopic vision will cause a problem of a vergence-accommodation conflict, that is, monocular focusing and binocular convergence are not located on the same plane, the vergence-accommodation conflict may cause problems of visual fatigue and dizziness, and how to solve the problem of the vergence-accommodation conflict is an issue urgent to be solved.

SUMMARY

The disclosure provides a display apparatus, including: a display panel, wherein the display panel includes a plurality of pixel columns which extend in a first direction and are arranged in a second direction, the first direction intersects the second direction, each of the pixel columns includes a plurality of pixel islands arranged in the first direction, each of the pixel islands includes at least four sub-pixels which have the same color, in each of the pixel columns, colors of the sub-pixels in pixel islands, adjacent to each other, in the first direction are different, and in the second direction, (odd number)$^{th}$ pixel columns are misaligned by a first preset distance in the first direction relative to (even number)$^{th}$ pixel columns; a light-transmitting pad layer on a light-emitting side of the display panel; and a cylindrical lens structure on one side of the light-transmitting pad layer away from the display panel, wherein the cylindrical lens structure includes a plurality of cylindrical lenses arranged in an array.

In some embodiments, a plurality of sub-pixels in each of the pixel islands are arranged continuously in the second direction to form one sub-pixel row.

In some embodiments, a plurality of sub-pixels in each of the pixel islands are arranged continuously in the first direction to form one sub-pixel row.

In some embodiments, a plurality of sub-pixels in each of the pixel islands are arranged into a plurality of sub-pixel rows; the plurality of sub-pixel rows are arranged in the first direction, and each of the sub-pixel rows includes at least two sub-pixels arranged continuously in the second direction; and in the first direction, sub-pixels in (odd number)$^{th}$ sub-pixel rows are misaligned by a second preset distance in the second direction relative to sub-pixels in (even number)$^{th}$ sub-pixel rows.

In some embodiments, the second preset distance is not smaller than a maximum width of a sub-pixel in the second direction.

In some embodiments, in each of the pixel islands, shapes of all the sub-pixels are the same.

In some embodiments, in each of the pixel islands, shapes of a first sub-pixel and a last sub-pixel arranged in the second direction are the same, shapes of the remaining sub-pixels are the same, and the shapes of the first sub-pixel and the last sub-pixel arranged in the second direction are different from the shapes of the remaining sub-pixels.

In some embodiments, in the second direction, a distance between two sub-pixels adjacent alternately in the different sub-pixel rows is smaller than a third preset distance.

In some embodiments, in the first direction, a distance between two sub-pixels adjacent alternately in the different sub-pixel rows is smaller than a fourth preset distance.

In some embodiments, in each of the pixel islands, on a side close to an adjacent sub-pixel row, each of sub-pixels of an sub-pixel row on a side, close to an adjacent sub-pixel row, of the sub-pixel row has a bevel edge; and an included angle between an extending direction of the bevel edge and the first direction and an included angle between the extending direction of the bevel edge and the second direction are both larger than 0.

In some embodiments, two sub-pixels adjacent alternately in the different sub-pixel rows have bevel edges parallel to each other, and a distance between the bevel edges parallel to each other is 0.5 to 3 microns.

In some embodiments, in the second direction, maximum widths of all the sub-pixels are the same; in the second direction, a distance between any two adjacent sub-pixels in the same sub-pixel row is equal; and in the first direction, maximum widths of all the sub-pixels are the same.

In some embodiments, a width of each of the pixel islands in the second direction is h1, and a width of each of the pixel islands in the second direction is h2, wherein h1 and h2 are positive values; each of the pixel islands includes m quantity of sub-pixel rows, and any two adjacent sub-pixel rows include i quantity of sub-pixels, wherein m and i are positive integers larger than 1; and a maximum width of each sub-pixel in the second direction is h1/i, and a maximum width of each sub-pixel in the first direction is h2/m.

In some embodiments, shapes of the sub-pixels are rectangular.

In some embodiments, the first preset distance is 0.

In some embodiments, colors of sub-pixels in the pixel islands in the same row arranged in the second direction are the same.

In some embodiments, the first preset distance is half of a maximum width of a sub-pixel in the first direction.

In some embodiments, each of the pixel islands includes two sub-pixel rows.

In some embodiments, an extending direction of an edge of the pixel island and an extending direction of edges of a part of sub-pixels are lon the same straight line.

In some embodiments, each of the cylindrical lenses corresponds to one pixel island.

In some embodiments, in the second direction, a width of an orthographic projection of the pixel island on the display panel is the same as an aperture of the cylindrical lens.

In some embodiments, each of the pixel islands corresponds to multiple cylindrical lenses.

In some embodiments, in the second direction, a width of an orthographic projection of multiple pixel islands corresponding to one cylindrical lens on the display panel is the same as an aperture of the cylindrical lens.

In some embodiments, the display panel further includes: a driving element, configured to drive, time division, sub-pixels in the multiple pixel islands corresponding to each cylindrical lens to display a gray-scale image.

In some embodiments, the plurality of cylindrical lenses are arranged closely.

In some embodiments, focal lengths of all the cylindrical lenses are the same.

In some embodiments, each of the sub-pixels includes an organic light-emitting diode or a micro-size inorganic light-emitting diode.

In some embodiments, the display panel includes a liquid crystal box.

An embodiment of the disclosure provides a display method of a display apparatus. The method includes: obtaining position information of a human eye relative to a display panel through a human eye tracking system; determining information about a view viewed by the human eye according to the position information; determining a target sub-pixel in a pixel island corresponding to the information about the view; and controlling the target sub-pixel to display a three-dimensional image, and controlling the remaining non-target sub-pixels to be turned off.

BRIEF DESCRIPTION OF THE DRAWINGS

In order to describe a technical solution in embodiments of the disclosure more clearly, accompanying drawings needed in description of the embodiments will be briefly introduced below. Apparently, the drawings in the following description are only some embodiments of the disclosure. Those ordinarily skilled in the art may obtain other drawings according to these drawings without creative work.

DETAILED DESCRIPTION OF THE EMBODIMENTS

In order to make objectives, technical solutions and advantages of the embodiments of the disclosure clearer, the technical solutions of the embodiments of the disclosure are described clearly and completely below with reference to the drawings of the embodiments of the disclosure. Apparently, the described embodiments are some, not all, of the embodiments of the disclosure. The embodiments in the disclosure and features in the embodiments may be mutually combined under the condition of no conflict. Based on the described embodiments of the disclosure, all other embodiments obtained those ordinarily skilled in the art without creative work fall within the protection scope of the disclosure.

Unless otherwise defined, technical or scientific terms used in the disclosure should be commonly understood by those ordinarily skilled in the art. "First", "second" and other similar words used in the disclosure do not denote any sequence, quantity or significance, but are only used for distinguishing different components. "Include" or "contain" and other similar words mean that an element or an item preceding the word cover elements or items and their equivalents listed after the word without excluding other elements or items. "Connection" or "connected" and other similar words may include electrical connection, direct or indirect, instead of being limited to physical or mechanical connection.

It should be noted that sizes and shapes of all figures in the drawings do not reflect a true scale and are only intended to illustrate contents of the disclosure. Same or similar reference numbers denote same or similar elements or elements with same or similar function all the time.

The disclosure provides a display apparatus, as shown in FIG. 1 to FIG. 10, including: a display panel 6, a light-transmitting pad layer 5 and a cylindrical lens structure 12.

The display panel 6 includes a plurality of pixel columns which extend in a first direction Y and are arranged in a second direction X, and the first direction Y intersects the second direction X. Each group of pixel columns includes a plurality of pixel islands arranged in the first direction Y. Each of the pixel islands includes at least four sub-pixels which have the same color. In each of the pixel columns, colors of the sub-pixels in the adjacent pixel islands in an extending direction of the pixel column are different, and in the second direction X, (odd number)$^{th}$ pixel columns are misaligned by a first preset distance in the first direction Y relative to (even number)$^{th}$ pixel columns.

The light-transmitting pad layer 5 is on a light-emitting side of the display panel 6.

The cylindrical lens structure 12 is on one side of the light-transmitting pad layer 5 away from the display panel 6, wherein the cylindrical lens structure 12 includes a plurality of cylindrical lenses 4 arranged in an array.

Figure 1:
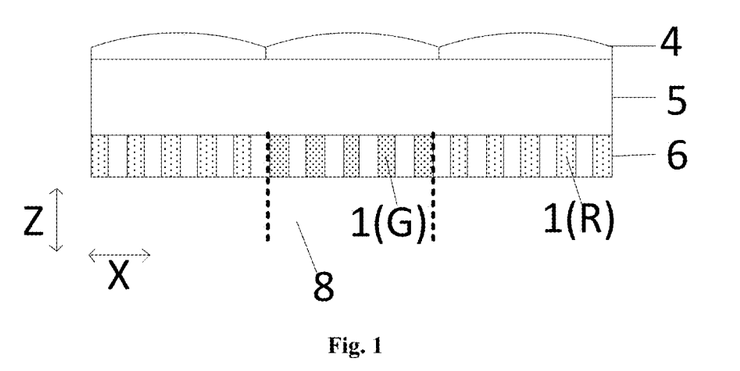
FIG. 1 is a schematic structural diagram of a display apparatus provided by an embodiment of the disclosure.

It needs to be noted that in the display apparatus provided by the embodiment of the disclosure, as shown in FIG. 1, a distance between the cylindrical lens structure 12 and a light-emitting surface of the display panel 6 meets a preset condition. A view area formed by making light emitted from each sub-pixel 1 in a pixel island 8 be transmitted to a human eye through a cylindrical lens 4 corresponding to the pixel island 8 is smaller than or equal to a pupil area. A distance between centers of adjacent view areas formed by making light emitted from adjacent sub-pixels 1 in a pixel island 8 be transmitted to the human eye through the cylindrical lens 4 corresponding to the pixel island 8 is smaller than or equal to half the diameter of the pupil area.

It needs to be noted that the display apparatus provided by the embodiment of the disclosure is a three-dimensional (3D) display apparatus based on light field display. The light field display may realize a real 3D scene like a real world. A light beam with a known direction is called a light ray field in the space, and a light field for short. In the light field, light beams entering an eye pupil needs an intersection point for image in the space, therefore, it may be known according to a geometrical relationship that collimated light beams emitted from more than two sub-pixels need to enter an eye pupil of a single eye at the same time, one sub-pixel represents one light ray and corresponds to one view point, that is, the eye pupil of the single eye needs to receive at least two view points at the same time, thus light rays emitted from the sub-pixels are transmitted to the pupil through a light-transmitting hole, and a view area is formed. A single-eye depth surface of light field display may be adjusted, clear-fuzzy transformation of different depth surfaces may be realized through human eye lens focusing, and thus it may be realized that monocular focusing and binocular convergence are located on the same plane.

In the display apparatus provided by the embodiment of the disclosure, each of the pixel islands includes at least four sub-pixels which have the same color, that is, the pixel island includes a plurality of sub-pixels which emit light continuously. Therefore, a placement height of the cylindrical lens structure may be matched with the sub-pixels, so a view area formed by making light emitted from each sub-pixel in a pixel island be transmitted to a human eye through a cylindrical lens corresponding to the pixel island is smaller than or equal to the pupil area, and a distance between centers of adjacent view areas formed by making light emitted from adjacent sub-pixels in the pixel island be transmitted to a human eye through a cylindrical lens corresponding to the pixel island is smaller than or equal to a half pupil area. As such, a requirement of the eye pupil of the single eye for needing to receive at least two view points at the same time is met and light field display is realized. It is realized that monocular focusing and binocular convergence are located on the same plane, the problem of visual fatigue and dizziness caused by a vergence-accommodation conflict may be solved, and user experience is improved.

Figure 2:
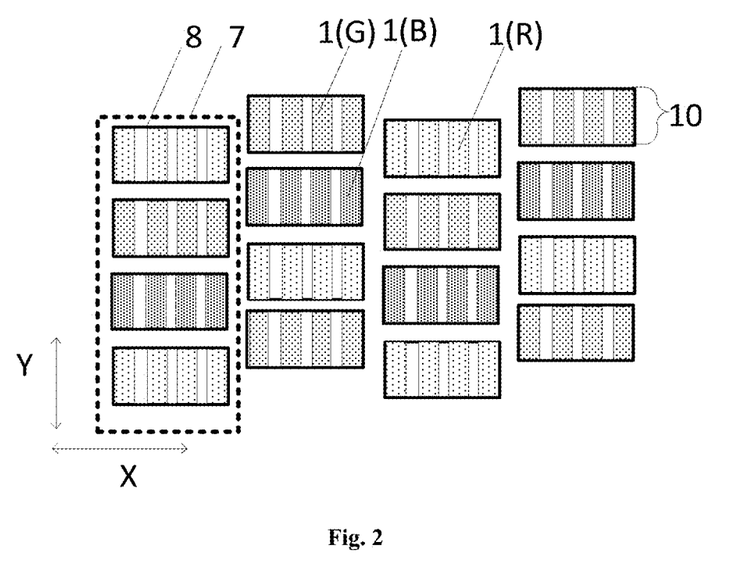
FIG. 2 is a schematic structural diagram of another display apparatus provided by an embodiment of the disclosure.

In some embodiments, as shown in FIG. 2, for example, the sub-pixel 1 includes: a red sub-pixel R, a green sub-pixel G and a blue sub-pixel B.

In some embodiments, as shown in FIG. 1 to FIG. 6, the first preset distance is larger than 0.

In the display apparatus provided by the embodiment of the disclosure, the (odd number)$^{th}$ pixel columns are misaligned by the first preset distance in the first direction Y relative to (even number)' pixel columns. When the first preset distance is larger than 0, the pixel islands of any one light-emitting color are not independently arranged on the same row or the same column, a distance between any two adjacent rows or columns of pixel islands with the same color is small. Therefore, during displaying of a pure color picture, horizontal or longitudinal dark stripes may be avoided. Thus a display effect of the display apparatus is improved, and user experience is improved.

In some embodiments, as shown in FIG. 2 to FIG. 6, the first preset distance is half of a maximum width of the pixel island 8 in the first direction Y.

Or in the some embodiments, as shown in FIG. 7 to FIG. 10, the first preset distance is 0.

Figure 8:
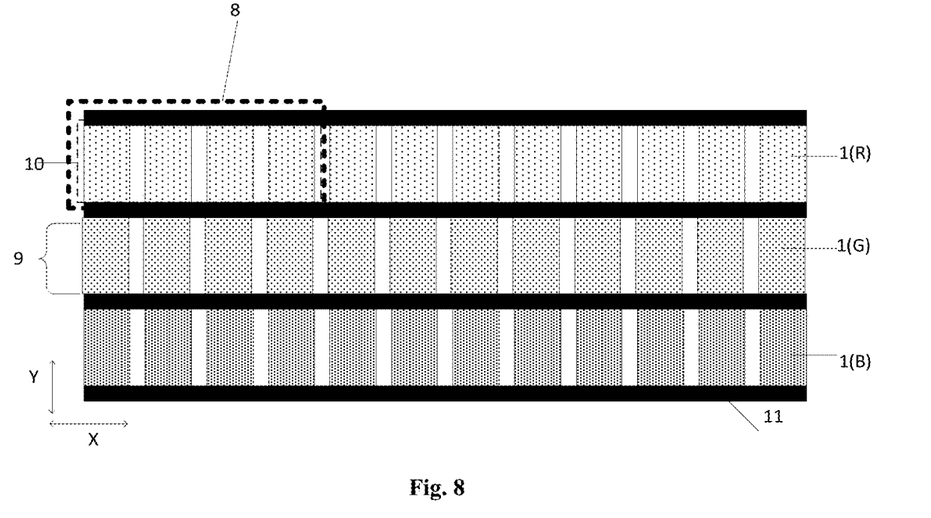
FIG. 8 is a schematic structural diagram of yet another display apparatus provided by an embodiment of the disclosure.
Figure 9:
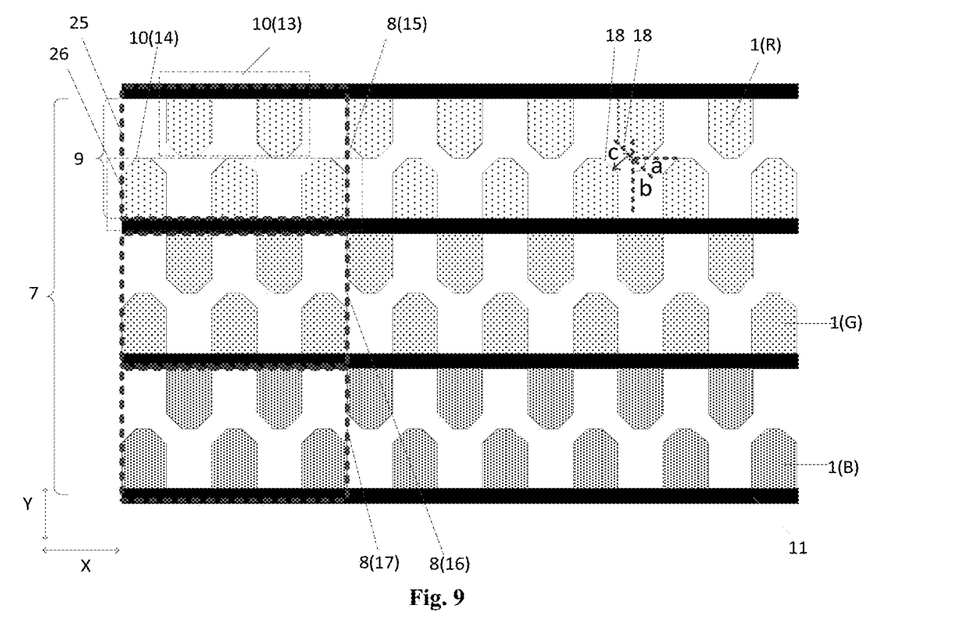
FIG. 9 is a schematic structural diagram of yet another display apparatus provided by an embodiment of the disclosure.
Figure 10:
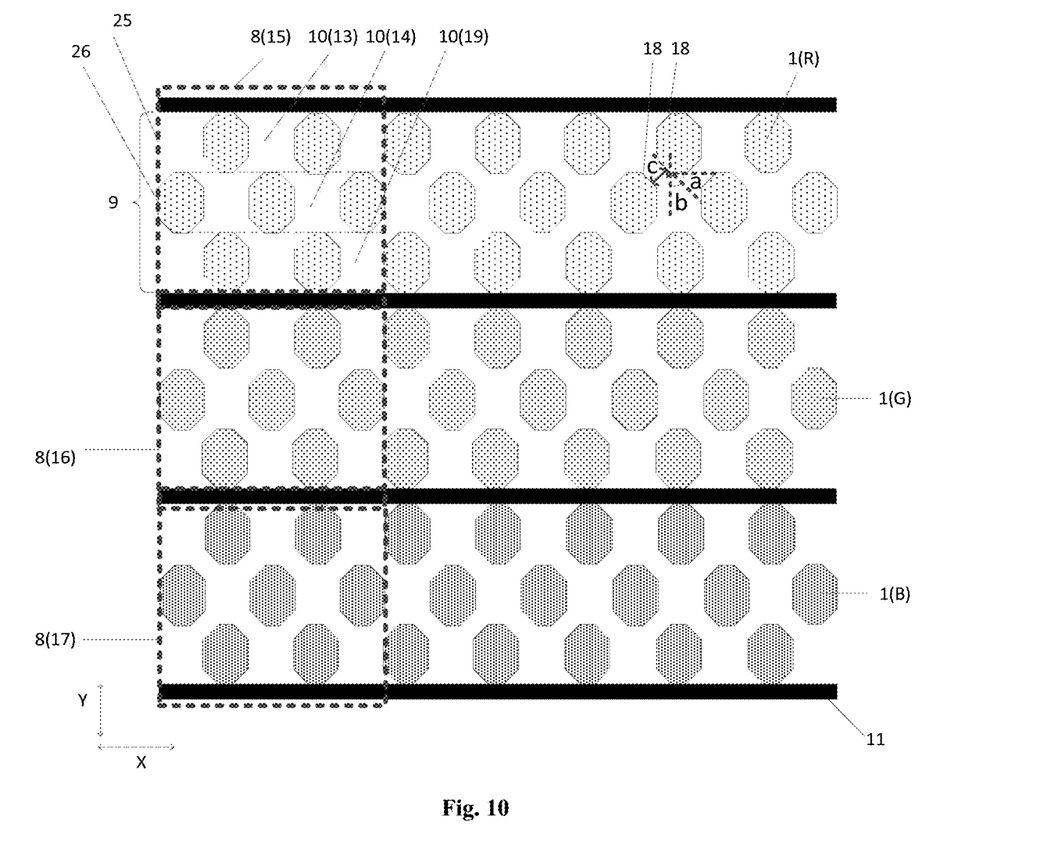
FIG. 10 is a schematic structural diagram of yet another display apparatus provided by an embodiment of the disclosure.

That is, as shown in FIG. 8 to FIG. 10, in the second direction X, the plurality of pixel islands 8 are arranged into a sub-pixel strip 9. The sub-pixels 1 in the sub-pixel strip 9 form a continuous light-emitting surface. Therefore, crosstalk between view points may be reduced while multi-view-point light field display is realized, and 3D display moire may be eliminated.

In some embodiments, as shown in FIG. 7 to FIG. 10, colors of sub-pixels 1 in the same row of pixel islands 8 arranged in the second direction X are the same.

That is, light-emitting colors of all the sub-pixels in the sub-pixel strip 9 are the same.

In the display apparatus provided by the embodiment of the disclosure, the first preset distance is 0, and the colors of the sub-pixels in the same row of pixel islands arranged in the second direction are the same. That is, all the sub-pixels in the same row of pixel islands may form a sub-pixel strip with a continuous light-emitting surface of the same light-emitting color. When the pixel islands of the display panel are designed, various pixel islands may be divided in one sub-pixel strip. That is, various pixel islands may be designed on the same display panel. Correspondingly, various sizes of the cylindrical lenses may be designed, and intelligent 3D display of switching among various resolutions and among various visual spaces may be realized.

It needs to be noted that FIG. 8 to FIG. 10 only shows a part of a region of a sub-pixel strip. The display panel 6 illustrated in FIG. 7 denotes that one sub-pixel strip 9 forms a continuous light-emitting surface of the same light-emitting color.

In some embodiments, as shown in FIG. 8 to FIG. 10, light-emitting colors of sub-pixels in two adjacent pixel islands 8 in the first direction Y are different. The plurality of pixel islands include: a first pixel island 15, a second pixel island 16, and a third pixel island 17. Light-emitting colors of the first pixel island 15, the second pixel island 16 and the third pixel island 17 are different with one another. The first pixel island 15, the second pixel island 16 and the third pixel island 17 may be, for example, combined into one pixel.

In some embodiments, as shown in FIG. 2 and FIG. 8, the plurality of sub-pixels 1 in each of the pixel islands 8 are arranged continuously in the second direction X to form one sub-pixel row 10.

Figure 3:
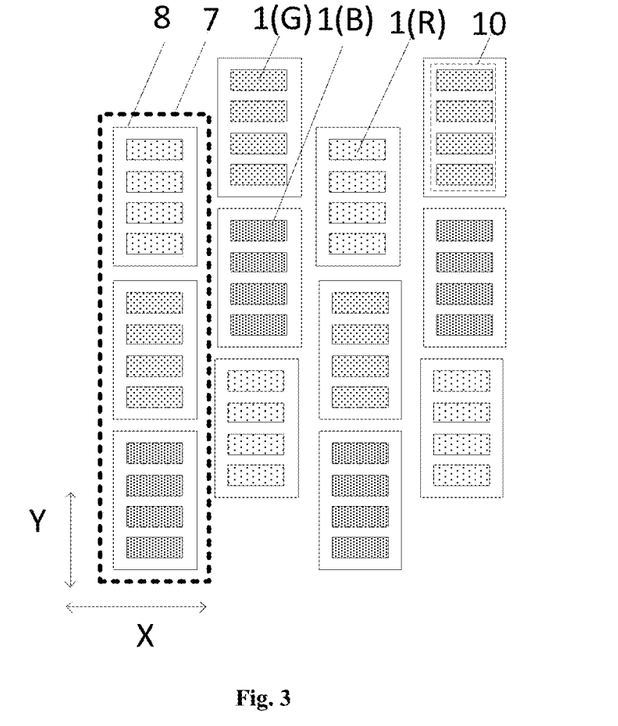
FIG. 3 is a schematic structural diagram of yet another display apparatus provided by an embodiment of the disclosure.

Or, in some embodiments, as shown in FIG. 3, the plurality of sub-pixels 1 in each of the pixel islands 8 are arranged continuously in the first direction Y to form one sub-pixel row 10.

In the display apparatus provided by the embodiment of the disclosure, the plurality of sub-pixels in each of the pixel islands are arranged into one row or one column to form a continuous light-emitting surface, crosstalk between the view points may be reduced while multi-view-point light field display is realized, and 3D display moire may be eliminated.

Of course, in some embodiments, as shown in FIG. 4, FIG. 5, FIG. 6, FIG. 8, FIG. 9 and FIG. 10, the plurality of sub-pixels 1 in each of the pixel islands 8 are arranged into a plurality of sub-pixel rows 10.

The plurality of sub-pixel rows 10 are arranged in the first direction Y, and each of the sub-pixel rows 10 includes at least two sub-pixels 1 arranged continuously in the second direction X.

In the display apparatus provided by the embodiment of the disclosure, the plurality of sub-pixels in each of the pixel islands are arranged into a plurality of sub-pixel rows, similarly, a continuous light-emitting surface may be formed in the second direction, so crosstalk between the view points may be reduced while multi-view-point light field display is realized, and 3D display moire may be further eliminated.

In some embodiments, as shown in FIG. 4, FIG. 5, FIG. 6, FIG. 9 and FIG. 10, in the first direction Y, sub-pixels 1 in (odd number)$^{th}$ sub-pixel rows 10 are misaligned by a second preset distance in the second direction X relative to the sub-pixels 1 in (even number)$^{th}$ sub-pixel rows 10.

In some embodiments, the second preset distance is 0.

Or in some embodiments, as shown in FIG. 4, FIG. 5, FIG. 6, FIG. 9 and FIG. 10, the second preset distance is larger than 0.

Figure 11:
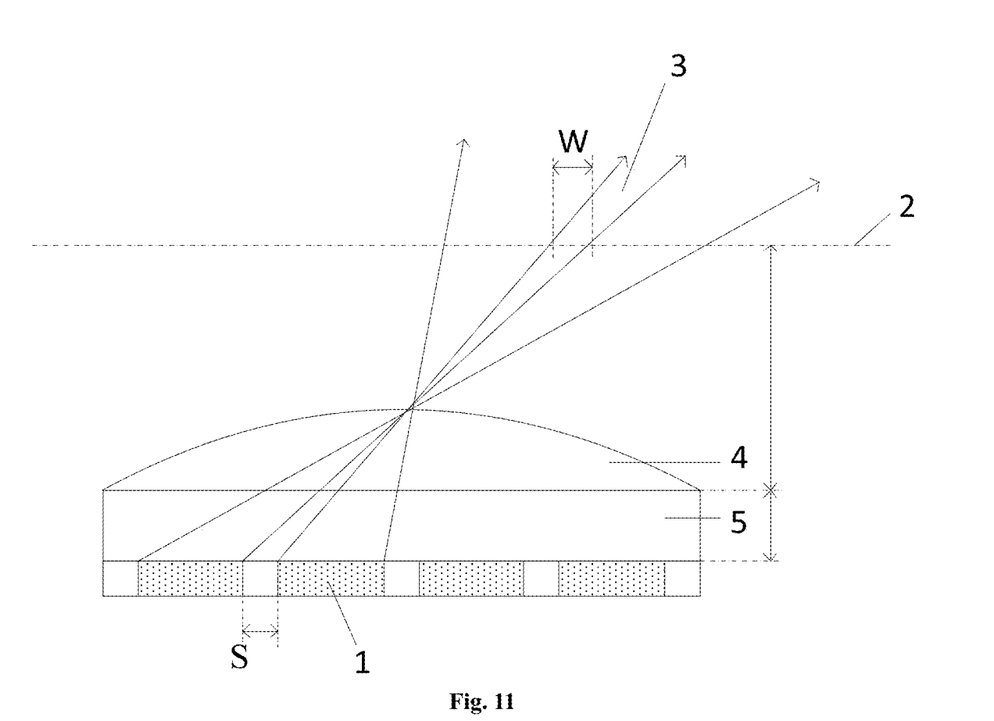
FIG. 11 is a schematic diagram of forming a black region of a display apparatus provided by an embodiment of the disclosure.

It needs to be noted that as each sub-pixel in each of the pixel islands need to be driven independently, when the sub-pixels in each of the pixel islands are arranged into one pixel row, as shown in FIG. 11, a distance S exists between the sub-pixels 1 and is usually in a range of 1.5 to 3 microns. As a distance between the sub-pixels is large, a certain black region 3 is definitely formed on an observation surface 2. A size W of the black region changes along with change of an observation distance H and the placement height h of the cylindrical lens 4. A formula of the size W of the black region is: $W=H*S/h$. A pixel defining layer needs to be arranged between the pixel islands, that is, a large distance also exists between the pixel islands, which may cause separation of lobe angles and form brightness moire.

In the display apparatus provided by the embodiment of the disclosure, the plurality of sub-pixels in the each pixel island are arranged into a plurality of sub-pixel rows, and sub-pixels in (odd number)$^{th}$ sub-pixel rows are misaligned by a second preset distance in the second direction X relative to sub-pixels in (even number) sub-pixel rows. The second preset distance is larger than 0. So two sub-pixels in the different pixel rows are distributed alternately in the second direction. No distance is between two adjacent sub-pixels in the different sub-pixel rows, and independently driving for each sub-pixel is not affected. A display black region caused by the distance between the sub-pixels in the second direction may be reduced or eliminated.

In some embodiments, as shown in FIG. 4, FIG. 5, FIG. 6, FIG. 9 and FIG. 10, the second preset distance is not greater than a maximum width of a sub-pixel 1 in the second direction X.

Figure 4:
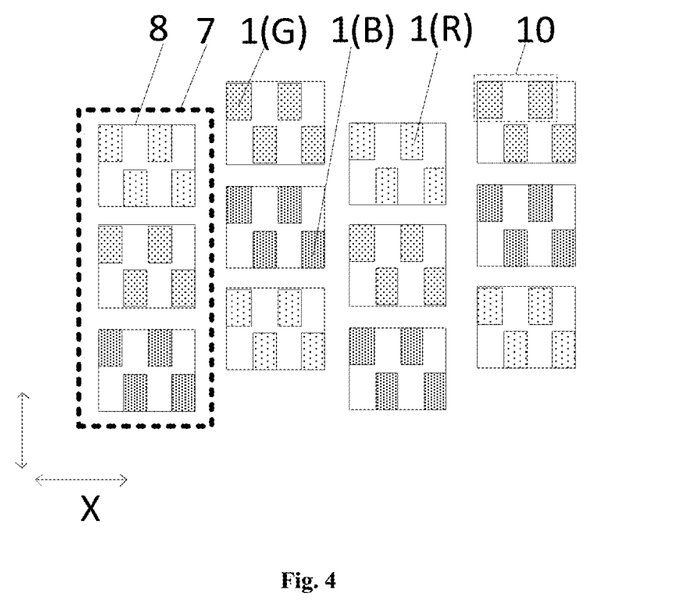
FIG. 4 is a schematic structural diagram of yet another display apparatus provided by an embodiment of the disclosure.
Figure 5:
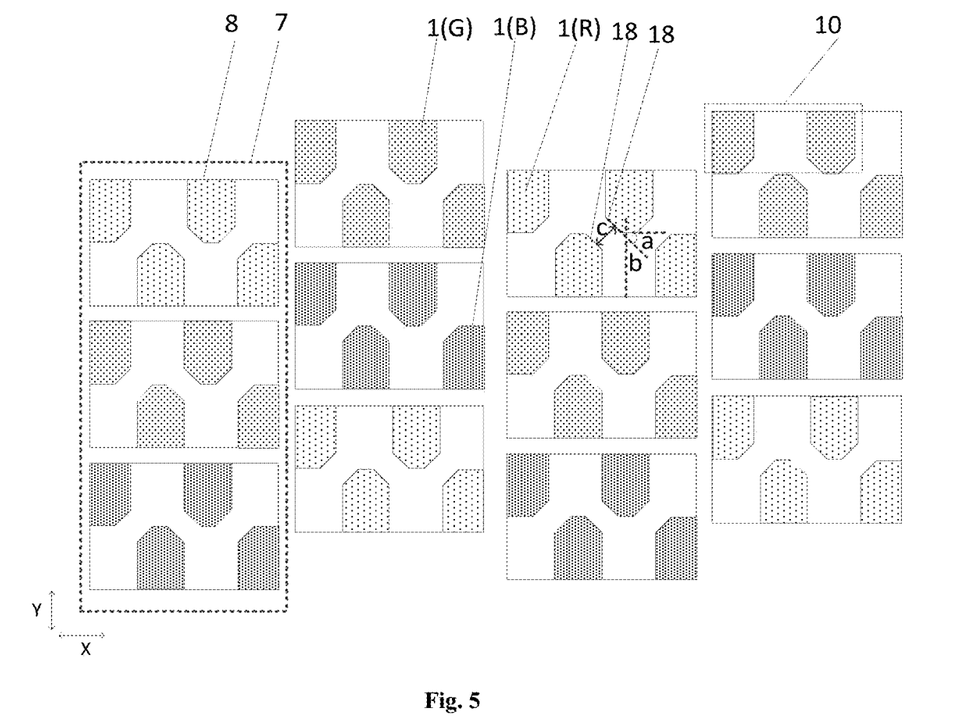
FIG. 5 is a schematic structural diagram of yet another display apparatus provided by an embodiment of the disclosure.
Figure 6:
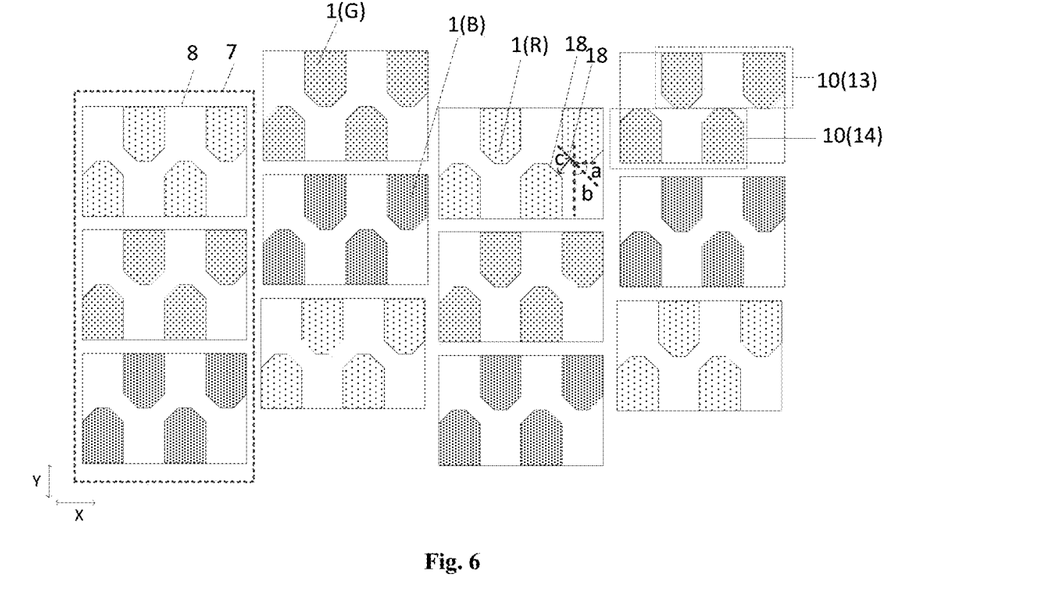
FIG. 6 is a schematic structural diagram of yet another display apparatus provided by an embodiment of the disclosure.

That is, in some embodiments, as shown in FIG. 4, FIG. 5. FIG. 6, FIG. 9 and FIG. 10, in the same sub-pixel row 10, a distance between two adjacent sub-pixels 1 is at most equal to a maximum width of one sub-pixel 1 in the second direction X.

In the display apparatus provided by the embodiment of the disclosure, the second preset distance is a maximum width of a sub-pixel in the second direction, so independently driving may be realized on each pixel while realizing that the plurality of sub-pixels in the pixel island form a continuous light-emitting surface in the second direction.

In some embodiments, when one pixel island includes a plurality of sub-pixel rows, as shown in FIG. 4, FIG. 5, FIG. 9 and FIG. 10, in each of the pixel islands 8, shapes of all the sub-pixels 1 are the same.

Therefore, light-emitting uniformity of each of the sub-pixels in the pixel island may be improved.

Or in some embodiments, as shown in FIG. 6, in each of the pixel islands 8, shapes of a first sub-pixel 1 and a last sub-pixel 1 arranged in the second direction X are the same, shapes of the remaining sub-pixels 1 are the same, and the shapes of the first sub-pixel 1 and the last sub-pixel 1 arranged in the second direction X are different from the shapes of the remaining sub-pixels 1.

In the display apparatus provided by the embodiment of the disclosure, as for the plurality of sub-pixels in one pixel island, a light-emitting area of most of sub-pixels may be increased by designing shapes of the sub-pixels, so light-emitting efficiency of the pixel island is improved.

In FIG. 6, description is made by taking one pixel island including four sub-pixels as an example. That is, shapes of the first sub-pixel and the fourth sub-pixel arranged in the second direction X are the same, shapes of a second sub-pixel and a third sub-pixel arranged in the second direction X are the same, and shapes of the first sub-pixel and the second sub-pixel are different.

In some embodiments, as shown in FIG. 4, FIG. 5, FIG. 6, FIG. 9 and FIG. 10, in the second direction X, a distance between two sub-pixels 1 adjacent alternately in the different sub-pixel rows 10 is smaller than a third preset distance.

It needs to be noted that during manufacturing of the display apparatus, there may be process errors, the third preset distance may be set according to actual process conditions of forming the sub-pixels. The third preset distance may be, for example, a value within a process error range between two adjacent sub-pixels adjacent alternately in the different sub-pixel rows.

In the display apparatus provided by the embodiment of the disclosure, in the second direction, the distance between the two sub-pixels adjacent alternately in the different sub-pixel rows is the third preset distance. The third preset distance is a value within the process error range. That is, in the same sub-pixel strip, in the second direction, a distance between the two sub-pixels adjacent alternately in the different sub-pixel rows is greatly reduced, and a display black region caused by the distance between the sub-pixels in the second direction may be reduced or even eliminated under the condition of independently driving each sub-pixel.

In some embodiments, the third preset distance is 0.

As shown in FIG. 4, FIG. 5, FIG. 6, FIG. 9 and FIG. 10, edges, extending in the first direction Y, of the two sub-pixels 1 adjacent alternately in the different sub-pixel rows 10 are located on the same straight line. That is, in the second direction X, the distance between the two sub-pixels 1 adjacent alternately in the different sub-pixel rows 10 is 0.

In the display apparatus provided by the embodiment of the disclosure, in the second direction, the distance between the two sub-pixels adjacent alternately in the different sub-pixel rows is 0. That is, in the same sub-pixel strip, in the second direction, there is no distance between the two sub-pixels adjacent alternately in the different sub-pixel rows, so the display black region caused by the distance between the sub-pixels in the second direction may be eliminated under the condition of independently driving each sub-pixel.

In the display apparatus provided by the embodiment of the disclosure, when the first preset distance is 0, light-emitting colors of the sub-pixels included in the plurality of pixel islands arranged in the second direction are the same, so there may be no distances among the plurality of pixel islands arranged in the second direction, and moire may be eliminated. Therefore, light field 3D display of no display black region, low crosstalk, no moire and multiple view points is realized.

In some embodiments, as shown in FIG. 4, FIG. 5, FIG. 6, FIG. 9 and FIG. 10, in the first direction Y, the distance between the two sub-pixels 1 adjacent alternately in the different sub-pixel rows 10 is smaller than a fourth preset distance.

In some embodiments, as shown in FIG. 4, shapes of the sub-pixels are rectangular.

In some embodiments, as shown in FIG. 4, the fourth preset distance is larger than 0.

In this way, as the shapes of the sub-pixels are rectangular, the fourth preset distance is larger than 0, so each sub-pixel may be driven independently while forming a continuous and light-emitting surface without gaps (distances) in the second direction. In some embodiments, the fourth preset distance may be, for example, a value within a range of 1.5 to 3 microns.

It needs to be noted that during manufacturing of the display apparatus, there may be process errors. The fourth preset distance may be set according to actual process conditions of forming the sub-pixels. The fourth preset distance may be, for example, a value within the process error range between the two sub-pixels adjacent alternately in the different sub-pixel row.

In the display apparatus provided by the embodiment of the disclosure, in the first direction, the distance between the two sub-pixels adjacent alternately in the different sub-pixel rows is a value within the process error range. In the same pixel island, in the first direction, the distance between the two sub-pixels adjacent alternately in the different sub-pixel rows is greatly reduced. An aperture opening area of the sub-pixels may be guaranteed while reducing or even eliminating the display black region, and thus an aperture opening ratio of the display apparatus may be guaranteed to the maximum degree.

In some embodiments, the fourth preset distance is equal to 0.

In some embodiments, as shown in FIG. 5, FIG. 6, FIG. 9 and FIG. 10, edges, extending in the second direction X, of the two sub-pixels 1 adjacent alternately in the different sub-pixel rows 10 are located on the same straight line. That is, in the first direction Y, the distance between the two sub-pixels 1 adjacent alternately in the different sub-pixel rows 10 is 0.

In the display apparatus provided by the embodiment of the disclosure, in the first direction, the distance between the two sub-pixels adjacent alternately in the different sub-pixel rows is 0. In the same pixel island, in the first direction, there is no distance between the two sub-pixels adjacent alternately in the different sub-pixel rows. The aperture opening area of the sub-pixels is guaranteed while eliminating the display black region, and thus the aperture opening ratio of the display apparatus is guaranteed to the maximum degree.

In some embodiments, as shown in FIG. 5, FIG. 6, FIG. 9 and FIG. 10, in each of the pixel islands 8, each sub-pixel 1 on a side close to an adjacent sub-pixel row 10 has a bevel edge 18, and an included angle a between an extending direction of the bevel edge and the second direction X and an included angle b between the extending direction of the bevel edge and the first direction Y are both larger than 0.

In the display apparatus provided by the embodiment of the disclosure, on the side close to the adjacent sub-pixel row, each sub-pixel has a bevel edge, so under the condition that the distances between the two sub-pixels adjacent alternately in the different sub-pixel rows in the second direction and the in the first direction are both 0, the sub-pixels in the same pixel island are mutually separated, and each sub-pixel may be driven independently. Besides, the bevel edge may guarantee the aperture opening area of the sub-pixel to the maximum degree and guarantee the aperture opening ratio of the display apparatus.

In some embodiments, as shown in FIG. 5, FIG. 6, FIG. 9 and FIG. 10, the included angle a between the extending direction of the bevel edge 18 and the second direction X and the included angle b between the extending direction of the bevel edge and the first direction Y are both 45 degrees.

Of course, the included angle between the extending direction of the bevel edge and the second direction and the included angle between the extending direction of the bevel edge and the first direction may be set to be other values, which are not limited by the disclosure.

In some embodiments, as shown in FIG. 5, FIG. 6, FIG. 9 and FIG. 10, the shape of each of the sub-pixels is rectangular with one or more bevel edge.

In some embodiments, as shown in FIG. 5 and FIG. 9, each of the sub-pixels has two bevel edges 18.

In some embodiments, as shown in FIG. 6, a part of sub-pixels have two bevel edges 18, and the remaining sub-pixels each have one bevel edge 18.

In some embodiments, as shown in FIG. 10, each of the sub-pixels has fourth bevel edges 18.

In some embodiments, as shown in FIG. 4 to FIG. 6 and FIG. 9, each of the pixel islands 8 includes two sub-pixel rows 10.

In some embodiments, when each of the pixel islands includes two sub-pixel rows and the sub-pixels have bevel edges, as shown in FIG. 5, FIG. 6 and FIG. 9, a shape of an opening of each sub-pixel 1 is a shape of a bevel edge on a side close to the adjacent sub-pixel row 10.

In some embodiments, description is made by taking FIG. 5 and FIG. 9 as an example, each of the pixel islands 8 includes a first sub-pixel row 13 and a second sub-pixel row 14, on a side of the first sub-pixel row 13 close to the second sub-pixel row 14, each sub-pixel 1 in the first sub-pixel row 13 has a bevel edge, and on a side of the second sub-pixel row 14 close to the first sub-pixel row 13, each sub-pixel 1 in the second sub-pixel row 14 has a bevel edge.

In this way, in the display apparatus provided by the embodiment of the disclosure, each of the pixel islands includes two sub-pixel rows, so the sub-pixels in each of the sub-pixel rows need be provided a bevel edge on only one side. An aperture opening area of the sub-pixels may be guaranteed to the maximum degree, and thus the aperture opening ratio of the display apparatus is guaranteed.

Of course, each of the pixel islands may also include more sub-pixel rows, as shown in FIG. 10, each of the pixel islands 8 includes three sub-pixel rows 10.

As for the display panel shown in FIG. 10, description is made by taking a first pixel island 15 as an example. The first pixel island 15 includes the first sub-pixel row 13, the second sub-pixel row 14 and the third sub-pixel row 19. As the second sub-pixel row 14 is adjacent to the other two sub-pixel rows, the sub-pixels in the second sub-pixel row 14 need four bevel edges. In FIG. 10, the shapes of all the sub-pixels in each of the sub-pixel strip are the same. Though each of the sub-pixels needs four bevel edges, the aperture opening ratio is slightly reduced, there may be more options for design of the quantity of the sub-pixels included in the pixel island.

Of course, in some embodiments, when the pixel island includes more than two sub-pixel rows, the sub-pixels in the first sub-pixel row and the last sub-pixel row arranged in the first direction may be the same in shape and each have at most two bevel edges, and the sub-pixels in the remaining sub-pixel rows in the first direction are the same in shape and each have four bevel edges. Shapes of the sub-pixels in the first sub-pixel row and the last sub-pixel row arranged in the first direction are different from shapes of the sub-pixels in the remaining sub-pixel rows in the first direction. In this way, the aperture opening ratio of a part of sub-pixels may be increased, the light-emitting efficiency of the pixel islands may be improved, and the light-emitting efficiency of the display apparatus is improved.

In some embodiments, as shown in FIG. 5, FIG. 6 and FIG. 9, the two sub-pixels 1 adjacent alternately in the different sub-pixel rows 10 have bevel edges 18 parallel to each other, and a distance c between the bevel edges 18 parallel to each other is 0.5 to 3 microns.

In some embodiments, the distance between the bevel edges parallel to each other may be set according to actual process conditions for forming the bevel edges.

In some embodiments, each of the sub-pixels includes an organic light-emitting diode or a micro-size inorganic light-emitting diode.

In some embodiments, the micro-size inorganic light-emitting diode may be a miniature light-emitting diode or a mini light-emitting diode.

In some embodiments, when each of the sub-pixels includes the organic light-emitting diode, a pixel defining layer is further between the adjacent pixel islands in the first direction.

It needs to be noted that when the pixel island includes one sub-pixel row, or when the first preset distance is larger than 0, a pixel defining layer is further between the two adjacent pixel islands in the second direction.

When the pixel island includes a plurality of sub-pixel rows and the first preset distance is 0, as shown in FIG. 9 and FIG. 10, a pixel defining layer 11 is between the adjacent pixel islands 8 in the first direction Y. A pixel defining layer does not need to be arranged between the adjacent pixel islands 8 in the second direction X.

In some embodiments, the display panel may be, for example, an electroluminescent display panel. The electroluminescent display panel includes: a base substrate, a driving circuit on the base substrate, and a pixel defining layer and an electroluminescent light-emitting device n the driving circuit. Electroluminescent light-emitting devices correspond to the sub-pixels in one-to-one mode. An insulating layer is between anodes of the electroluminescent light-emitting devices and the driving circuit. The anodes are electrically connected to the driving circuit by via holes penetrating through the insulating layer. The pixel defining layer and the anodes may be, for example, on the same insulation layer. The pixel defining layer covers a part of anodes. When each of the pixel islands includes two sub-pixel rows, each of the sub-pixel rows is adjacent to the pixel defining layer, so the via holes through which the electroluminescent light-emitting devices corresponding to the sub-pixels are electrically connected to the driving circuit may be set in a region covered by the pixel defining layer. Therefore, the aperture opening ratio of the sub-pixels may be guaranteed without increasing difficulty for manufacturing the display panel.

Of course, in some embodiments, the display panel includes a liquid crystal box.

That is, the display apparatus provided by the embodiment of the disclosure may be a liquid crystal display apparatus.

In some embodiments, a black matrix, for example, is between the adjacent pixel islands in at least first direction.

In some embodiments, the display apparatus further includes a backlight module on one side of the liquid crystal box away from the cylindrical lenses.

In some embodiments, as shown in FIG. 1 to FIG. 10, in the second direction X, maximum widths of all the sub-pixels 1 are the same.

In the second direction X, a distance between any two adjacent sub-pixels 1 in the same sub-pixel row 10 is the same.

In the display apparatus provided by the embodiment of the disclosure, in the second direction, the maximum widths of all the sub-pixels are the same. The sub-pixels in the same sub-pixel row are distributed in equal distance. In this way, as for the display apparatus with the first preset distance being 0, after distribution of the sub-pixels of the display apparatus is determined, the display panel may have various modes for dividing pixel islands, and the quantity of sub-pixels included in each of the pixel islands may be selected according to demands. That is, the pixel islands may be freely divided according to demands, so that the pixel islands is divided more flexible. Correspondingly, there may be various modes for designing sizes of the cylindrical lenses matched with the pixel islands. That is, the same display panel may be applied to 3D display of various resolutions.

In some embodiments, the pixel islands may be divided and the sizes of the cylindrical lenses may be designed according to a resolution and the quantity of view points needing to be met by the display apparatus.

In some embodiments, as shown in FIG. 2 to FIG. 6, and FIG. 8 to FIG. 10, in the first direction Y, maximum widths of all the sub-pixels 1 are the same.

In some embodiments, a width of each of the pixel islands in the second direction is h1, and a width of each of the pixel islands in the second direction is h2, wherein h1 and h2 are positive values.

Each of the pixel islands includes m quantity of sub-pixel rows, and any two adjacent sub-pixel rows include i quantity of sub-pixels, wherein m and i are positive integers larger than 1.

The maximum width of each of the sub-pixels in the second direction is h1/i, and the maximum width of each of the sub-pixels in the first direction is h2/m.

For example, each of the pixel islands includes two sub-pixel rows, one of the two sub-pixel rows includes two sub-pixels, the other sub-pixel row includes two sub-pixels, that is, two sub-pixel rows in each of the pixel islands include four sub-pixels, so the maximum width of each of the sub-pixels in the second direction is h1/4, and the maximum width of each of the sub-pixels in the first direction is h2/2.

In some embodiments, as shown in FIG. 2 to FIG. 6, and FIG. 8 to FIG. 10, the quantity of the sub-pixels 1 included in each of the pixel islands 8 is the same.

In some embodiments, when the pixel island includes the plurality of sub-pixel rows, as shown in FIG. 5 to FIG. 6, in each of the pixel islands 8, the quantity of the sub-pixels 1 included in each of the sub-pixel rows 10 is the same.

Or in some embodiments, when the pixel island includes the plurality of sub-pixel rows, as shown in FIG. 8 and FIG. 9, in each of the pixel islands 8, the respective quantities of the sub-pixels 1 included in the respective sub-pixel rows 10 is not the same completely.

In some embodiments, in each of the pixel islands, the quantity of the sub-pixels included in each of the sub-pixel rows needs to be designed according to a total quantity of the pixel rows in the pixel islands and the total quantity of the sub-pixels in the pixel islands.

It needs to be noted that description is made by taking one pixel island 8 including four sub-pixels 1 in FIG. 2 to FIG. 6 and FIG. 8 as an example, description is made by taking one pixel island 8 including five sub-pixels 1 in FIG. 9 as an example, and description is made by taking one pixel island 8 including seven sub-pixels 1 in FIG. 10 as an example. In some embodiments, the quantity of the sub-pixels included in the pixel islands may be selected according to actual demands.

In some embodiments, the first preset distance is 0 and light-emitting colors of the sub-pixels in a plurality of pixel islands in one row in the second direction are the same. That is, the plurality of pixel islands in one row in the second direction form one sub-pixel strip. For example, the sub-pixel strip includes n sub-pixels and k pixel islands, wherein n and k are positive integers. So n/k is a positive integer.

In some embodiments, in the first direction, an extending direction of an edge of the pixel island and an extending direction of edges of a part of sub-pixels are on the same straight line.

In some embodiments, when the first preset distance is 0, as shown in FIG. 9 and FIG. 10, an edge 25, extending in the first direction, of the pixel island 8 and an edge 26, extending in the first direction, of a part of the sub-pixels 1 have an overlapping portion.

As shown in FIG. 9 and FIG. 10, each edge 25, extending in the first direction Y, of the pixel island 8 and an edge 26, extending in the first direction Y, of a part of the sub-pixels 1 are on the same straight line.

In this way, in the display apparatus provided by the embodiment of the disclosure, as there is no distance between the sub-pixels adjacent alternately in the different sub-pixel rows, there is no distance between the pixel islands, so moire may be eliminated.

It needs to be noted that in FIG. 9 and FIG. 10, annotation is only made for an edge on one side of the pixel island 8 and an edge on one side of the sub-pixels 1 extending in the first direction Y. On the other side, the extending direction of the edge of the pixel island and the extending direction of the edge of a part of sub-pixels in the first direction Y are on the same straight line.

Figure 7:
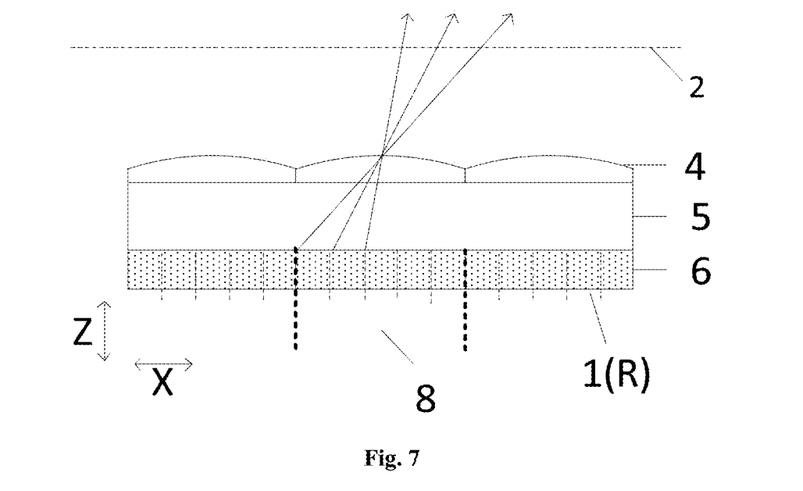
FIG. 7 is a schematic structural diagram of yet another display apparatus provided by an embodiment of the disclosure.

In some embodiments, as shown in FIG. 1 and FIG. 7, each of the cylindrical lenses 4 corresponds to one pixel island 8.

In this way, under the condition that the quantity of the pixel islands of the display apparatus is fixed, each of the cylindrical lenses corresponds to one pixel island, so the resolution of the display apparatus may be guaranteed to the maximum degree.

In some embodiments, as shown in FIG. 1 and FIG. 7, in the second direction X, a width of an orthographic projection of the pixel island 8 on the display panel is the same as an aperture of the cylindrical lens 4.

In this way, all view areas projected in the space by the pixel islands through the cylindrical lenses are in seamless connection, and the light field 3D display effect of ultra-large view space is realized.

Figure 12:
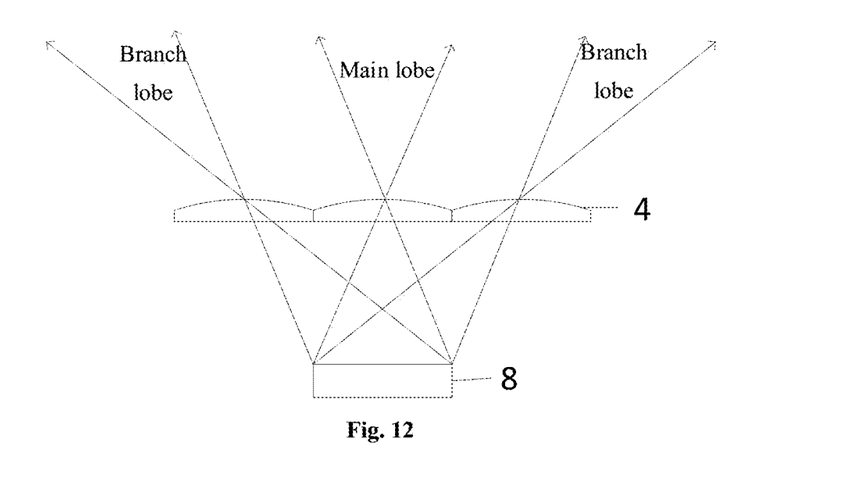
FIG. 12 is a schematic diagram of a lobe angle of a display apparatus provided by an embodiment of the disclosure.

It needs to be noted that in some embodiments, each of the pixel islands forms a plurality of lobe angles through each of the cylindrical lenses, and lobe angles formed by each of the pixel islands are in seamless connection. Thus light field 3D display of the ultra-large view space is realized. As shown in FIG. 12, the lobe angles formed by each of the pixel islands through each of the cylindrical lenses include a main lobe and a plurality of branch lobes.

Certainly, in some embodiments, each of the pixel islands may correspond to the plurality of cylindrical lenses.

In some embodiments, in the second direction, a width of an orthographic projection of the plurality of pixel islands corresponding to one cylindrical lens on the display panel is the same as the aperture of the cylindrical lens.

In this way, all view areas projected in the space by the pixel islands through the cylindrical lenses are in seamless connection, and the light field 3D display effect of ultra-large view space is realized.

In some embodiments, the display panel further includes: a driving element, configured to drive, in time division, sub-pixels in one or more pixel islands corresponding to each cylindrical lens to display a gray-scale image.

In some embodiments, taking one cylindrical lens corresponding to two pixel islands as an example, in first half frame of one time frame, sub-pixels in one pixel island are driven by the driving element to emit light, and in last half frame of the one frame, the sub-pixels in the other pixel island are driven by the driving element to emit light.

Figure 13:
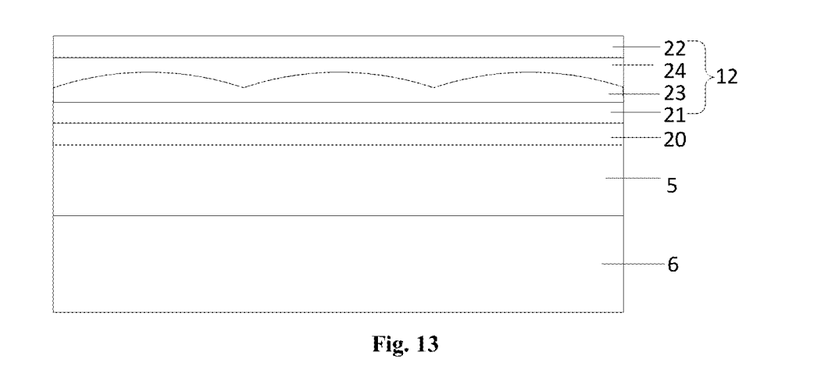
FIG. 13 is a schematic structural diagram of another display apparatus provided by an embodiment of the disclosure.

In some embodiments, as shown in FIG. 13, the cylindrical lens structure 12 includes: a first substrate 20 on one side of the light-transmitting pad layer 5 away from the display panel 6, a second substrate 22 on one side of the first substrate 20 away from the display panel 6, a cylindrical lens layer 23 between the first substrate 21 and the second substrate 22, and a flat layer 24 between the cylindrical lens layer 23 and the second substrate 22. A refractive index of the cylindrical lens layer 23 is larger than a refractive index of the flat layer 24. As shown in FIG. 13, the cylindrical lens structure 12 adheres to the display panel 6 through an optical clear adhesive 21.

In some embodiments, the cylindrical lens layer includes a plurality of cylindrical lenses.

In some embodiments, materials of the first substrate and the second substrate include PET.

In some embodiments, materials of the cylindrical lens layer and the flat layer include resin. A refractive index of resin included in the cylindrical lens layer is larger than a refractive index of resin included in the flat layer.

It needs to be noted that design of a set height, a radius of curvature and other parameters of the cylindrical lens meets, for example, that a light-emitting surface of the display panel is on a focus surface of the plurality of cylindrical lenses.

In some embodiments, the plurality of cylindrical lenses are arranged closely.

In this way, the cylindrical lens does not need a contraction design, so fabricating difficulty of the cylindrical lens may be lowered.

In some embodiments, focal lengths of all the cylindrical lenses are the same.

Figure 14:
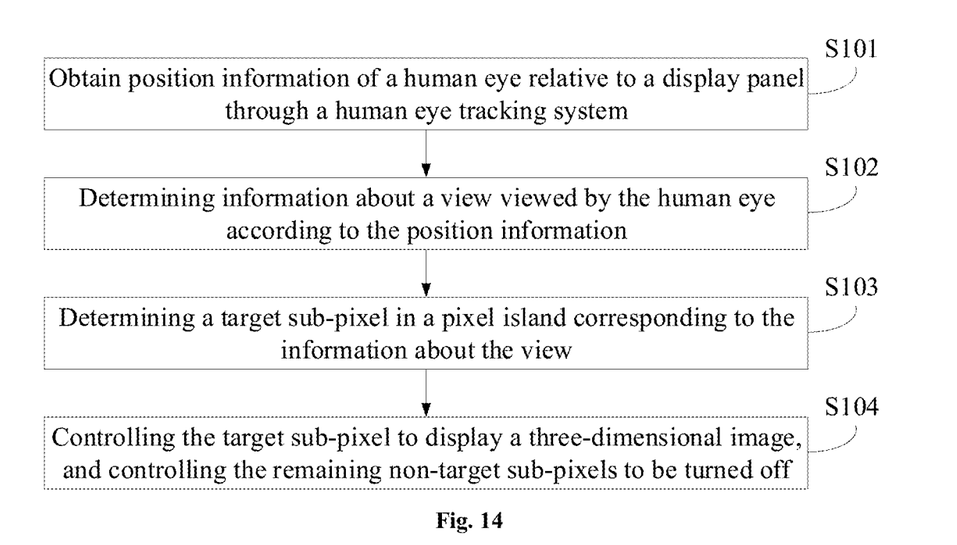
FIG. 14 is a schematic diagram of a display method of a display apparatus provided by an embodiment of the disclosure.

An embodiment of the disclosure further provides a display method of a display apparatus, as shown in FIG. 14, including the following.

S101, position information of a human eye relative to a display panel is obtained through a human eye tracking system.

S102, information about a view viewed by the human eye is obtained according to the obtained position information of the human eye relative to the display panel.

S103, a target sub-pixel in a pixel island corresponding to view information about the view is determined.

S104, the determined target sub-pixel is controlled to display a three-dimensional image, and other non-target sub-pixels are controlled to be turned off.

In some embodiments, view layout processing is performed in combination with eye tracking, sub-pixels corresponding to double eyes obtained through tracking only need to be turned on, corresponding information about a 3D view is loaded, the remaining sub-pixel is turned off, and thus 3D display may be realized.

The display apparatus provided by the embodiment of the disclosure may be: a mobile phone, a tablet PC, a TV, a display, a notebook computer, a digital photo frame, a navigator and any other product or component with a display function. Other essential components of the display apparatus should be understood by those ordinarily skilled in the art, which is neither described in detail herein, nor used to limit the disclosure.

To sum up, according to the display apparatus and the display method thereof provided by the embodiments of the disclosure, the display panel in the display apparatus includes the plurality of pixel strips, each of the pixel strips includes the plurality of sub-pixel strips, and the light-emitting colors of the sub-pixels in each of the sub-pixel strips are the same. So each of the sub-pixel strips may form the continuous light-emitting surface, the various pixel islands may be divided in each of the pixel strips, that is, various designs for pixel islands may be made for the same display panel. Correspondingly, the various sizes of the cylindrical lenses may be designed, and intelligent 3D display of switching among various resolutions and among various view spaces may be realized. Besides, each of the sub-pixel strips includes the plurality of sub-pixel rows, and the sub-pixels in the adjacent sub-pixel rows are distributed alternately. So no distance is between the two adjacent sub-pixels distributed alternately and located in the different sub-pixel rows, and independently driving for each of the sub-pixels is not affected. Thus the display black region caused by the distance between the sub-pixels in the first direction may be reduced or even eliminated.

Though the preferred embodiments of the disclosure are already described, those skilled in the art may make extra changes and modifications to these embodiments once they know a basic inventive concept. Therefore, the appended claims intend to be constructed as including the preferred embodiments and all changes and modifications falling within the scope of the disclosure.

Apparently, those skilled in the art may make various changes and transformations to the embodiments of the disclosure without departing from the spirit and the scope of the embodiments of the disclosure. In this case, if these changes and transformations of the embodiments of the disclosure fall within the scope of the claims and their equivalents of the disclosure, the disclosure also intends to include these changes and transformations.

What is claimed is:

1. A display apparatus, comprising:
    a display panel; wherein: the display panel comprises a plurality of pixel columns which extend in a first direction and are arranged in a second direction, and the first direction intersects the second direction; each pixel columns comprises a plurality of pixel islands arranged in the first direction; each of the pixel islands comprises at least four sub-pixels which have the same color; in each of the pixel columns, colors of sub-pixels in adjacent pixel islands in the first direction are different; and in the second direction, (odd number)$^{th}$ pixel columns are misaligned by a first preset distance in the first direction relative to (even number)$^{th}$ pixel columns;
    a light-transmitting pad layer on a light-emitting side of the display panel; and
    a cylindrical lens structure on one side of the light-transmitting pad layer away from the display panel; wherein the cylindrical lens structure comprises a plurality of cylindrical lenses arranged in an array;
    wherein the plurality of sub-pixels in each of the pixel islands are arranged into a plurality of sub-pixel rows;
    the plurality of sub-pixel rows are arranged in the first direction, and each of the sub-pixel rows comprises at least two sub-pixels arranged continuously in the second direction; and
    in the first direction, sub-pixels in (odd number)$^{th}$ sub-pixel rows are misaligned by a second preset distance in the second direction relative to sub-pixels in (even number)$^{th}$ sub-pixel rows.

2. The display apparatus according to claim 1, wherein the plurality of sub-pixels in each of the pixel islands are arranged continuously in the second direction to form one sub-pixel row; or
    the plurality of sub-pixels in each of the pixel islands are arranged continuously in the first direction to form one sub-pixel row.

3. The display apparatus according to claim 2, wherein shapes of the sub-pixels are rectangular.

4. The display apparatus according to claim 1, wherein the second preset distance is not smaller than a maximum width of a sub-pixel in the second direction.

5. The display apparatus according to claim 1, wherein in each of the pixel islands, shapes of all the sub-pixels are the same; or
    in each of the pixel islands, shapes of a first sub-pixel and a last sub-pixel arranged in the second direction are the same, shapes of the remaining sub-pixels are the same, and the shapes of the first sub-pixel and the last sub-pixel arranged in the second direction are different from the shapes of the remaining sub-pixels.

6. The display apparatus according to claim 1, wherein in the second direction, a distance between two sub-pixels adjacent alternately in the different sub-pixel rows is smaller than a third preset distance.

7. The display apparatus according to claim 6, wherein in the first direction, a distance between two sub-pixels adjacent alternately in the different sub-pixel rows is smaller than a fourth preset distance.

8. The display apparatus according to claim 7, wherein a width of each of the pixel islands in the second direction is h1, and a width of each of the pixel islands in the second direction is h2, wherein h1 and h2 are positive values;
    each of the pixel islands comprises m quantity of sub-pixel rows, and any two adjacent sub-pixel rows comprise i quantity of sub-pixels, wherein m and i are positive integers larger than 1; and
    a maximum width of each sub-pixel in the second direction is h1/i, and a maximum width of each sub-pixel in the first direction is h2/m.

9. The display apparatus according to claim 1, wherein in each of the pixel islands, each of sub-pixels of an sub-pixel row on a side, close to an adjacent sub-pixel row, of the sub-pixel row has a bevel edge; and an included angle between an extending direction of the bevel edge and the first direction and an included angle between the extending direction of the bevel edge and the second direction are both larger than 0.

10. The display apparatus according to claim 9, wherein two sub-pixels adjacent alternately in the different sub-pixel rows have bevel edges parallel to each other, and a distance between the bevel edges parallel to each other is 0.5 to 3 microns.

11. The display apparatus according to claim 1, wherein in the second direction, maximum widths of all the sub-pixels are the same;
    in the second direction, a distance between any two adjacent sub-pixels in the same sub-pixel row is equal; and
    in the first direction, maximum widths of all the sub-pixels are the same.

12. The display apparatus according to claim 1, wherein the first preset distance is 0.

13. The display apparatus according to claim 12, wherein colors of the sub-pixels in the pixel islands in the same row in the second direction are the same.

14. The display apparatus according to claim 1, the first preset distance is half of a maximum width of a sub-pixel in the first direction.

15. The display apparatus according to claim 1, wherein each of the pixel islands comprises two sub-pixel rows.

16. The display apparatus according to claim 1, wherein an extending direction of an edge of the pixel island and an extending direction of edges of a part of sub-pixels are on the same straight line.

17. The display apparatus according to claim 16, wherein each of the cylindrical lenses corresponds to one pixel island; or
each of the pixel islands corresponds to multiple cylindrical lenses.

18. The display apparatus according to claim 17, wherein in a condition that each of the cylindrical lenses corresponds to one pixel island, in the second direction, a width of an orthographic projection of the pixel island on the display panel is the same as an aperture of the cylindrical lens; or
in a condition that each of the pixel islands corresponds to multiple cylindrical lenses, in the second direction, a width of an orthographic projection of the multiple pixel islands corresponding to one cylindrical lens on the display panel is the same as an aperture of the cylindrical lens.

19. The display apparatus according to claim 18, wherein the display panel further comprises:
a driving element, configured to drive, in time division, the sub-pixels in the multiple pixel islands corresponding to each cylindrical lens to display a gray-scale image.

20. A display method of a display apparatus, wherein the display apparatus is according to claim 1, and the method comprises:
obtaining position information of a human eye relative to a display panel through a human eye tracking system;
determining information about a view viewed by the human eye according to the position information;
determining a target sub-pixel in a pixel island corresponding to the information about the view; and
controlling the target sub-pixel to display a three-dimensional image, and controlling the remaining non-target sub-pixels to be turned off.

* * * * *